United States Patent [19]
Fletcher et al.

[11] 3,864,953
[45] Feb. 11, 1975

[54] METER FOR USE IN DETECTING TENSION IN STRAPS HAVING PREDETERMINED ELASTIC CHARACTERISTICS

[76] Inventors: James C. Fletcher, Administrator of the National Aeronautics and Space Administration with respect to an invention by; George V. Buhler, 18570 Santa Ynez St., Fountain Valley, Calif. 92708; Dale E. Havens, 323 Avienda Cerritas, Newport Beach, Calif. 92660

[22] Filed: Oct. 11, 1973
[21] Appl. No.: 405,342

[52] U.S. Cl................................ 73/143, 33/148 D
[51] Int. Cl. ............................................. G01l 5/06
[58] Field of Search............... 73/143, 95, 89, 88 R; 33/147 D, 148 R, 148 D, 148 E

[56] References Cited
UNITED STATES PATENTS

| | | | |
|---|---|---|---|
| 1,300,790 | 4/1919 | Tretch | 33/147 D |
| 1,848,828 | 3/1932 | Griffin | 73/143 UX |
| 2,376,038 | 5/1945 | Dawson | 33/147 D |
| 2,468,496 | 4/1949 | Ingle | 33/148 R |
| 3,492,731 | 2/1970 | Diehl | 33/148 D |

FOREIGN PATENTS OR APPLICATIONS

| | | | |
|---|---|---|---|
| 479,098 | 4/1936 | Great Britain | 73/88 R |
| 1,101,733 | 4/1955 | France | 33/148 R |

*Primary Examiner*—Charles A. Ruehl
*Attorney, Agent, or Firm*—Wayland H. Riggins; L. D. Wofford, Jr.; John R. Manning

[57] ABSTRACT

A meter for use in detecting tension in fabric straps having predetermined elastic characteristics. The meter is characterized by a pair of elongated arms disposed in juxtaposed, substantial parallelism, a clevis interconnecting the arms for pivotal motion in a common plane about a common axis, a pair of juxtaposed receivers integrally related with the first ends of the arms and supported for arcuate motion thereby, said receivers being configured to receive and secure therein a pair of adjacent portions of a fabric strap, and a pressure-responsive device mounted at the second ends of the arms for measuring and indicating the magnitude of arcuate motion imparted to the receivers as tension-induced stretching of the strap occurs.

2 Claims, 5 Drawing Figures

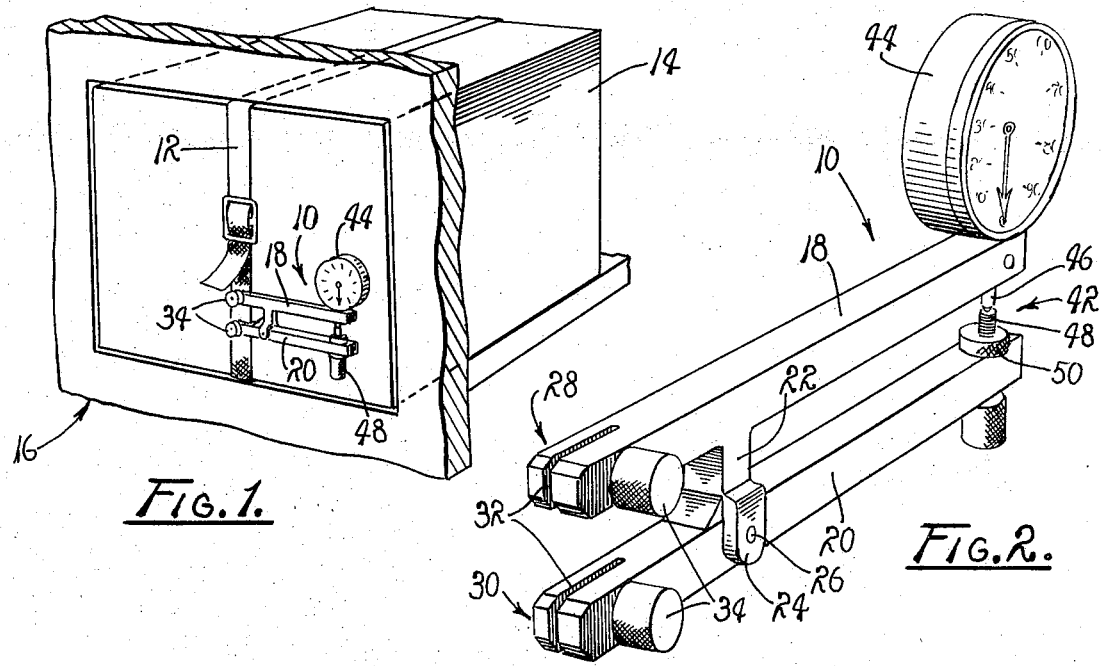
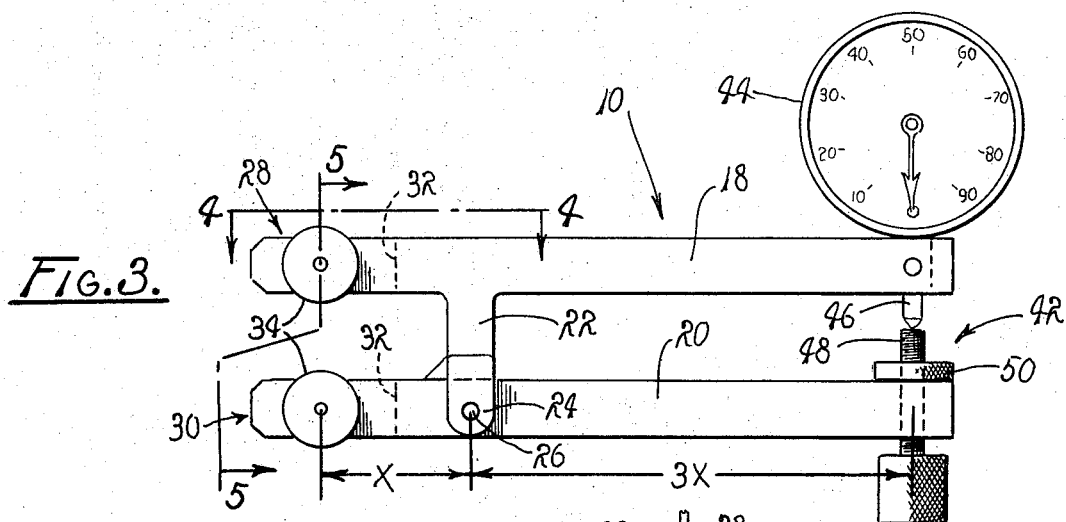
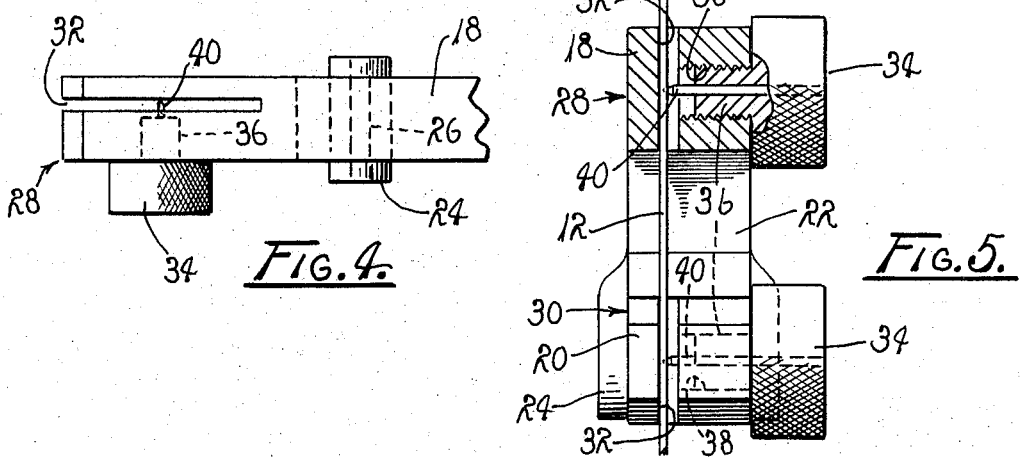

METER FOR USE IN DETECTING TENSION IN STRAPS HAVING PREDETERMINED ELASTIC CHARACTERISTICS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The invention relates to meters for detecting tension in elastic bodies and more particularly to a meter for use in indicating tension in fabric straps employed as tie-down straps for stowed objects.

It is, of course, common practice to employ cables, straps, lines and other similar devices for securing stowed objects in place aboard vehicles of various types, as well as in compartments subjected to vibratory motion and the like. Normally, such devices are "snugged down" by an operator who through his senses of feel is able to determine the sufficiency of the tension within the device. However, it has been found that when stowing objects aboard spacecraft and the like, a precise tensioning of the tie-down devices must be effected.

Normally, lightweight fabric straps are provided for securing objects in place aboard spacecraft. For reasons which are readily apparent to those engaged in stowing objects aboard spacecraft, the straps employed must be placed in predetermined tension. Unfortuantely, tension must be measured between the strap's buckle and a secured end thereof. In some cases, access to the strap is quite limited. This, of course, increases the difficulties encountered in appropriately tensioning the strap.

Of course, tensiometers and the like often are used to measure the tension of steel bands, cables and the like as they extend over relatively clear spans. Such devices make use of the deflection of an eccentrically loaded column and normally include wheatstone bridges for providing data read-out indicative of the magnitude of tension detected. These devices tend to be complicated, generally are expensive to manufacture and often require more space than there is available for their use in detecting tension in tie-down straps.

Therefore, devices such as tensiometers and the like simply do not satisfactorily fulfill the need for a simple and economic device which can readily be employed in determining the sufficiency of the tension of a fabric strap as the strap is tightened for securing objects in a stowed condition aboard spacecraft.

It is therefore a general purpose of the instant invention to provide an improved meter which is particularly suited for use in indicating tension over a small span of a fabric strap placed in tension as the strap is tightened for securing objects in a stowed condition aboard spacecraft and the like.

OBJECTS AND SUMMARY OF THE INVENTION

It is an object of the instant invention to provide an improved meter for use in measuring the tension of straps as the straps are tightened.

It is another object to provide a meter for use by personnel in stowing objects aboard spacecraft utilizing fabric straps for tie-down purposes.

It is another object to provide a meter particularly adapted to provide a direct and instant read-out of the tension of a fabric strap employed for securing objects in a stowed condition aboard spacecraft.

Another object is to provide a meter particularly suited for use in providing intelligence indicative of tension over a small span of a fabric strap as a tension load is applied thereto.

These and other objects and advantages are achieved through the use of a pair of elongated arms coupled together for pivotal motion about a common axis in a common plane, a strap receiver located at adjacent ends of the arms for receiving and securing therewithin adjacent portions of the strap, said receivers being supported by the arms for motion along intersecting arcs, and motion detection means located at the opposite ends of the arms for detecting the magnitude of the motion imparted to the receivers as the strap is placed in tension.

BRIEF DESCRIPTION OF THE DRAWINGS

FIG. 1 is a fragmented perpsective view depicting one manner in which the meter of the instant invention may be employed.

FIG. 2 is a perspective view, on an enlarged scale, of the meter illustrated in FIG. 1.

FIG. 3 is a front elevational view of the meter shown in FIGS. 1 and 2.

FIG. 4 is a fragmented view taken generally along line 4—4 of FIG. 3.

FIG. 5 is a sectioned end view of the meter, taken generally along line 5—5 of FIG. 3.

DESCRIPTION OF THE PREFERRED EMBODIMENT

Referring now to the drawings wherein like reference characters designate like or corresponding parts throughout the several views, there is shown in FIG. 1 a meter 10 embodying the principles of the instant invention.

As shown in FIG. 1, the meter 10 is attached to a fabric strap 12 employed as a tie-down device for securing an object, such as a container 14, in a stowed condition within a locker, generally designated 16.

It is, of course, to be understood that use of the meter 10 is not limited to use in the performance of procedures for stowing objects aboard spacecraft, and that the meter can be employed in substantially any instance wherein the tension of a strap having a propensity to elongate under tension is to be determined. Therefore, it is to be understood that while the meter 10 is hereinafter described as having particular utility in carrying out stowage procedures conducted aboard spacecraft, the meter can be employed quite satisfactorily for numerous similar purposes.

The meter 10 includes a pair of juxtaposed arms, designated 18 and 20, respectively, disposed in substantial parallelism. The arm 18 includes a rigid link 22 orthogonally related to the arm 18. The link is rigidly affixed, at its base, to the arm 18, while the distal end of the link 22 is provided with a clevis 24. The clevis 24 is provided with a clevis pin 26 concentrically related to an axis about which the arms 18 and 20 are afforded oscillation by the pin. As a practical matter, the clevis 24 is of a yoke-like configuration while the clevis pin 26 is seated at each of its opposite ends in suitable coaxially related openings, not designated, formed in the clevis 24 and is extended through a suitable bore, also not designated, provided in the arm 20. Thus the clevis pin 26 serves as a bearing pin for supporting both of the arms 18 and 20 for oscillatory displacement about a common axis. This displacement causes the adjacent ends of the arms 18 and 20 to scribe intersecting arcs having different radii.

Provided at adjacent first ends of the arms 18 and 20 there is a pair of receivers, designated 28 and 30. It is important here to note that the distance between the pivot pin 26 and either of the receivers 28 and 30 is substantially less than the distance between the pivot pin 26 and the opposite ends of the arms 18 and 20. As illustrated in FIG. 3, the distance between the receivers and the pivot pin is a predetermined multiple of the distance between the pivot pin and the opposite ends of the arms. Thus, it should readily be apparent, that the motion imparted to the first ends of the arms 18 and 20 is magnified at the opposite ends thereof.

The receivers 28 and 30 serve to attach the meter 10 to the strap 12, as illustrated in FIG. 1. Since the receivers 28 and 30 are of a common design and configuration, a detailed description of a single one of the receivers is deemed adequate to provide a complete understanding of the invention.

As shown in FIG. 4, the receiver 28 includes a slotted opening 32 having planar surfaces, not designated, arranged in spaced parallelism for receiving therebetween a planar portion of the strap 12. The opening 32 is suitably dimensioned and configured so that the strap may be readily inserted into and extracted from the opening 32. In order to secure a received portion of the strap within the slotted opening 32, there is provided a clamp screw 34 having a knurled head, not designated, and a screw-threaded body 36. The body 36 is seated in a screw-threaded bore formed in the distal end portion of the arm 18, intersecting the slotted opening 32. The clamp screw 34 preferably is provided with a concentrically related needle 40.

The needle 40 is secured to the body 36 of the clamp screw 34 and penetrates the fabric of the strap 12 as the clamp screw is tightened for thus assuring that the strap is secured to the receiver 28. Of course, where desired, the configuration of the needle 40 may be modified or even deleted and appropriate substitutions made therefor, depending upon the particular material and the nature of the strap and the purpose thereof. In any event, it should be understood that the clamp screw 34 for the receivers 28 and 30 serves to secure the meter 10 to adjacent portions of the strap 12.

At the ends of the arms 18 and 20, opposite the receivers 28 and 30, respectively, there is mounted a pressure-responsive device, generally designated 42, through which the magnitude of the relative motion imparted to the receivers 28 and 30 is measured and a visual read-out is provided. The pressure-responsive device 42 includes a spring-loaded scale 44 mounted on the arm 18 having a plunger 46 extended toward the adjacent end of the arm 20. The adjacent end of the arm 20, on the other hand, supports an adjustable anvil 48 disposed in coaxial alignment with the plunger 46. The anvil 48 preferably is a screw-threaded member having a knurled head, not designated. The anvil is supported for axial adjustment while a stop nut 50 is provided for securing the anvil in an adjusted position, relative to the arm 20. Thus, the position of the anvil 48 relative to the arm 20 and the plunger 46 can be varied as described.

Since pressure-responsive devices are notoriously old, a detailed description of the device 42 is omitted in the interest of brevity. However, it is to be understood that as the receivers 28 and 30, supported by the arms 18 and 20, are moved relative to each other, in response to a tensioning of the strap 12, the plunger 46 and the anvil 48 are moved relative to each other. Thus motion imparted to the arms 18 and 20, about the clevis pin 26, as a consequence of a stretching of the strap 12, causes the anvil 48 to act against the plunger 46 for forcing the plunger 46 to act on the scale 44. The magnitude of the pressure applied by the anvil 48 to the plunger 46 is indicated by the scale 44. The scale 44 provides a visual output or reading which is indicative of the increased distance between the receivers 28 and 30. The increased distance is, of course, a function of the tension of the strap.

Moreover, it is to be understood that other pressure-responsive devices can be employed equally as well as long as a visual read-out is provided for indicating changes in the distances between the receivers 28 and 30.

OPERATION

It is believed that in view of the foregoing description, the operation of the device will readily be understood and it will be briefly reviewed at this point.

With the meter 10 assmebled in the manner hereinbefore described, the anvil 48 is positioned relative to the plunger 46 by threadedly advancing the anvil in a selected direction. The stop nut 50 is then tightened for securing the anvil 48 in place. Preferably, the position of the anvil 48, relative to the arm 20, is such that the plunger 46 engages the anvil 48 as parallelism is established between the arms 18 and 20. Thus the meter 10 is prepared for operation.

The meter is attached to a selected strap, such as the strap 12, prior to the strap being placed in tension sufficient to impart an elongation to adjacent portions thereof. The clamp screws 34 are advanced so that the needles 40 penetrate the fabric of the strap 12 for securely fastening each of the receivers 28 and 30 to the strap at adjacent, but spaced, locations. With the meter 10 thus secured to the strap 12, the strap is placed in tension.

As the strap 12 is placed in tension, an elongation thereof is effected. This elongation serves to increase the distance between the receivers 28 and 30. As the distances increase between the receivers, the arms 18 and 20 undergo pivotal motion about the pivot pin 26, whereupon the anvil 48 serves to apply pressure to the plunger 46. This pressure is transmitted to the scale 44 which provides a visual read-out indicative of the pressures provided. This read-out is indicative of the relative displacement of the receivers 28 and 30 and, consequently, is indicative of the magnitude of tension in the strap. In practice, the visual read-out is compared to an empirically established curve plotted for the material of the strap 12 under known tension loads.

In view of the foregoing, it should readily be apparent that the meter 10 of the instant invention provides a practical solution to the perplexing problem of providing a simple, economic, and readily employable meter for determining tension loads of fabric straps.

Although the invention has been herein shown and described in what is conceived to be the most practical and preferred embodiment, it is recognized that departures may be made therefrom within the scope of the invention, which is not to be limited to the illustrative details disclosed.

We claim:

1. In a meter for use in indicating tension in straps having predetermined elastic characteristics, the improvement comprising:

a pair of mutually displaceable receivers, each receiver of said pair including a block having planar surfaces defining therewithin a slotted opening for receiving therebetween a selected portion of a strap having a propensity to elongate when placed in tension;

means for securing said block to the strap including a clamping pin supported for axial reciprocation along a path intersecting the plane of said planar surfaces;

a pair of elongated, juxtaposed arms, each arm of said pair being characterized by a distal end portion integrally related with one receiver of said pair whereby each receiver is supported at one end of said arm;

means including a pivot pin for pivotally coupling one arm of said pair to the other arm thereof, whereby the arms are supported for pivotal displacement about a common axis as motion is imparted to the arms;

pressure measuring means mounted on one arm of said pair, at the end opposite said distal end thereof, and having a plunger extended toward the other arm of said pair;

means including an anvil mounted on said other arm of said pair in juxtaposition with said plunger for applying thereto pressure of a magnitude dictated by the magnitude of displacement imparted to said receivers;

visual read-out means coupled with said pressure measuring means for indicating the magnitude of the pressure applied to said plunger;

the distance between said pivot pin and said plunger being at least three times the distance between said pivot pin and said clamping pins.

2. The meter of claim 1 wherein said coupling means includes a rigid link projected from said one arm, means defining within the distal end of said link a clevis for receiving a portion of the other arm of said pair, and a pivot pin extended through said other arm and having its ends seated in said clevis.

* * * * *